(12) United States Patent
Preuhs et al.

(10) Patent No.: US 12,711,613 B2
(45) Date of Patent: Aug. 18, 2026

(54) PROVIDING A SPECIFICATION

(71) Applicant: Siemens Healthcare GmbH, Erlangen (DE)

(72) Inventors: Elisabeth Preuhs, Erlangen (DE); Christian Kaethner, Forchheim (DE); Stephan Kellnberger, Erlangen (DE); Markus Kowarschik, Nuremberg (DE); Hayo Knoop, Forchheim (DE)

(73) Assignee: Siemens Healthineers AG, Forchheim (DE)

( * ) Notice: Subject to any disclaimer, the term of this patent is extended or adjusted under 35 U.S.C. 154(b) by 126 days.

(21) Appl. No.: 18/075,173

(22) Filed: Dec. 5, 2022

(65) Prior Publication Data

US 2023/0186471 A1 Jun. 15, 2023

(30) Foreign Application Priority Data

Dec. 15, 2021 (DE) ..................... 10 2021 214 399.7

(51) Int. Cl.
*G06T 7/00* (2017.01)

(52) U.S. Cl.
CPC .. *G06T 7/0012* (2013.01); *G06T 2207/20081* (2013.01)

(58) Field of Classification Search
None
See application file for complete search history.

(56) References Cited

U.S. PATENT DOCUMENTS

2018/0360543 A1 12/2018 Roh et al.
2019/0262084 A1 8/2019 Roh et al.
(Continued)

FOREIGN PATENT DOCUMENTS

DE 102020204574 A1 10/2021
DE 102020204985 A1 10/2021

OTHER PUBLICATIONS

Favaro, Alberto et al. "Optimized 3D Path Planner for Steerable Catheters with Heuristic Search and Uncertainty Tolerance"; IEEE International Conference on Robotics and Automation; Dec. 31, 2018, pp. 9-16.
Kweon, Jihoon et al. "Deep Reinforcement Learning for Guidewire Navigation in Coronary Artery Phantom"; IEEE Access, Dec. 13, 2021, pp. 166409-166422.
Rahman, Sami et al. "An Image Processing Based Patient-Specific Optimal Catheter Selection"; Dec. 31, 2013; Dissertation Excerpt, pp. 1-26.

*Primary Examiner* — Patricia J Park
(74) *Attorney, Agent, or Firm* — Lempia Summerfield Katz LLC

(57) ABSTRACT

A method for providing a specification include receiving a planning dataset, wherein the planning dataset has a pre-ascertained mapping and/or a model of an examination object. The method further includes capturing selection information relating to one or more available medical object (s) and determining the specification by applying a specification function to input data, wherein the input data is based on the planning dataset and the selection information, wherein the specification has suitability information and a desired path, wherein the desired path has a plurality of spatial and/or temporal control points, which control points specify desired positionings for the one available medical object or one of the plurality of available medical objects respectively, and wherein the suitability information assesses suitability of the at least one available medical object for the desired path. The method further includes providing the specification as output data of the specification function.

20 Claims, 8 Drawing Sheets

(56) References Cited

U.S. PATENT DOCUMENTS

| | | | | |
|---|---|---|---|---|
| 2021/0059767 | A1 | 3/2021 | Ekin | |
| 2021/0315649 | A1 | 10/2021 | Kaethner et al. | |
| 2021/0322105 | A1 | 10/2021 | Kaethner et al. | |
| 2021/0343397 | A1 | 11/2021 | Orr et al. | |
| 2021/0378752 | A1 | 12/2021 | Paul et al. | |
| 2023/0363821 | A1* | 11/2023 | Levin | G09B 23/28 |

* cited by examiner

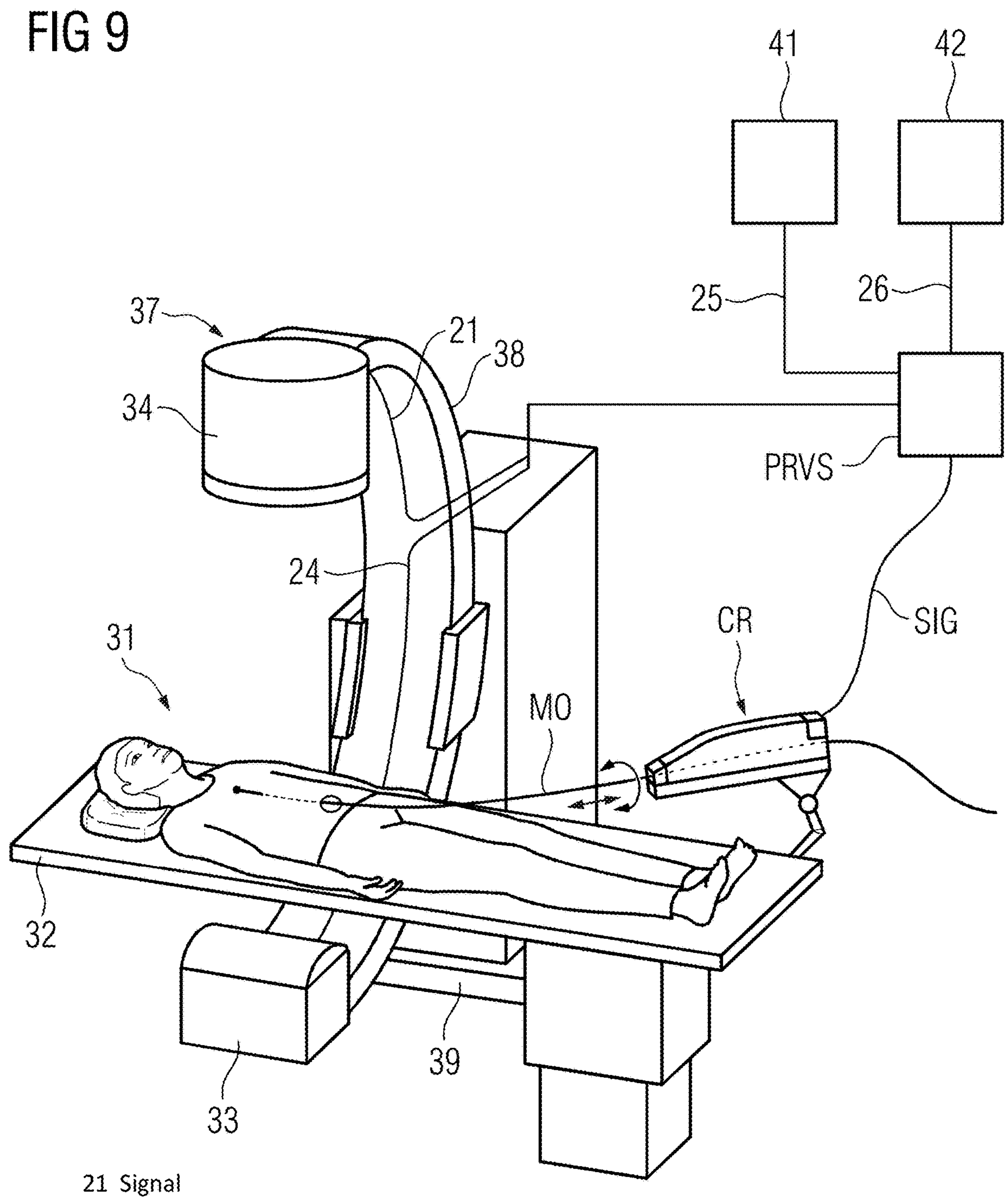
21 Signal
24 Signal
25 Signal
26 Signal
31 Examination object
32 Patient supporting apparatus
33 X-ray source
34 Detector
37 C-arm x-ray device
38 Arm
39 Movement unit
41 Representation unit
42 Input unit
MO Medical object
CR Movement apparatus
SIG Signal
PRVS Provisioning unit

PROVIDING A SPECIFICATION

The present patent document claims the benefit of German Patent Application No. 10 2021 214 399.7, filed Dec. 15, 2021, which is hereby incorporated by reference in its entirety.

TECHNICAL FIELD

The disclosure relates to a method for providing a specification, to a method for providing a trained function, to a system, to a training unit and to a computer program product.

BACKGROUND

Medical imaging, (e.g., X-ray based imaging), is frequently an integral component of a decision-making process during interventional medical procedures, in particular in highly complex and/or time-critical applications. After acquiring and processing medical image data of an examination object, a graphical representation of the medical image data for a medical operator, (e.g., a doctor), may make it possible to capture, in particular visually, the instantaneous status and/or progression of the procedure. During such procedures, the medical operator is frequently positioned at one side of a patient supporting apparatus in order to interact with the equipment used in the procedure, (e.g., the medical imaging device and/or medical objects). It is hereby possible for the medical operator to adjust, as required, acquisition parameters and/or processing parameters of the medical image data and/or a positioning of the medical imaging device for acquiring the medical image data and/or the medical object in order to provide an optimum result for the examination object. The core of such interventional procedures may lie in introducing different medical objects into the examination object and the arrangement and/or movement thereof to different treatment sites in the examination object, e.g., to be able to carry out procedural steps at these treatment sites. For different applications at different anatomical regions of the examination object, (e.g., a brain, heart, and/or liver), there are different medical objects, (e.g., guide wires, guide catheters, stents, balloon catheters, imaging catheters such as intravascular ultrasound catheters and/or catheters for optical coherence tomography, respiration catheters, coil, and/or stent retrievers). The medical objects frequently differ in size, length, material, shape, and/or mechanical properties. Frequently a medical object is manually introduced intraprocedurally via a radial or femoral entry point into the examination object, in particular a hollow organ of the examination object, (e.g., a vessel and/or a vessel segment), wherein the medical object, in particular a distal section of the medical object, is to be moved to the treatment site. The movement and/or arrangement of the at least one medical object is frequently monitored by medical imaging, in particular using intraprocedural medical image data of the examination object.

The path, along which the at least one medical object is to be moved to the treatment site, is frequently determined manually by the medical operator on the basis of medical imaging, (e.g., the medical image data), during the movement and/or on the basis of the properties, (e.g., the shape), of the at least one medical object. Owing to the different properties of the medical objects, which are available for the respective procedure, such path planning may quickly become too complex for the medical operator. This may adversely increase a risk of injury to the examination object and/or prolong a duration of the procedure unnecessarily and/or increase an X-ray dose.

SUMMARY AND DESCRIPTION

It is therefore the object of the present disclosure to enable improved path planning for interventional procedures.

The scope of the present disclosure is defined solely by the appended claims and is not affected to any degree by the statements within this summary. The present embodiments may obviate one or more of the drawbacks or limitations in the related art.

The solution is described hereinafter in relation to methods and apparatuses for providing a specification and in relation to methods and apparatuses for providing a trained function. Features, advantages, and alternative embodiments of data structures and/or functions in methods and apparatuses for providing a specification may be transferred here to analogous data structures and/or functions in methods and apparatuses for providing a trained function. Analogous data structures may be characterized here in particular by the use of the prefix “training.” Furthermore, the trained functions used in methods and apparatuses for providing a specification may have been adjusted and/or provided in particular by methods and apparatuses for providing a trained function.

The disclosure relates in a first aspect to a method, (e.g., a computer-implemented method), for providing a specification. A planning dataset is received, which has a preascertained mapping and/or a model of an examination object. Furthermore, selection information relating to one or more available medical object(s) is captured. The specification is determined by applying a specification function to input data. The input data is based on the planning dataset and the selection information. The specification has suitability information and a desired path. The desired path has a plurality of spatial and/or temporal control points, which specify desired positionings for the one available medical object or one of the plurality of available medical objects respectively. The suitability information assesses a suitability of the at least one available medical object for the desired path. Hereafter the specification is provided as output data of the specification function.

The above-described acts of the proposed method for providing a specification may advantageously be carried out successively and/or at least partially simultaneously.

Receiving the planning dataset may include, in particular, capturing and/or reading out a computer-readable data memory and/or receiving from a data memory unit, (e.g., a database). Furthermore, the planning dataset may be provided by a provisioning unit of a medical imaging device for acquiring the planning dataset. The medical imaging device may include a magnetic resonance tomography system (MRT) and/or a computed tomography system (CT) and/or a medical X-ray device, (e.g., a medical C-arm X-ray device), and/or an ultrasound device and/or a positron emission tomography system (PET).

The planning dataset may advantageously include an, in particular time-resolved, 2D and/or 3D mapping of the examination object, in particular of a hollow organ of the examination object. In particular, the planning dataset may include a contrasted and/or segmented mapping of the examination object, in particular of the hollow organ. Furthermore, the planning dataset may map the examination object preprocedurally and/or intraprocedurally. Alternatively or in addition, the planning dataset may have a 2D and/or 3D model, in particular a central line model and/or a volume model, (e.g., a volume mesh model), of the examination object, in particular of the hollow organ. The planning dataset may advantageously be registered with a coordinate system of the examination object, in particular a patient coordinate system. In addition, the planning dataset may have patient information, (e.g., a patient history and/or anamnesis data relating to the examination object and/or information relating to a further medical object), which further medical object is already arranged in the examination object. The planning dataset may have information, in particular positioning information and/or an identification relating to a stent, which is already arranged in the examination object before the beginning of the method.

Capturing the selection information may include capturing a user input by an input unit. A medical operator may provide the selection information as the user input by the input unit. The input unit may include a keyboard and/or a pointing device. The medical operator may identify and/or select the one or more available medical object(s), e.g., using a selection list of a plurality of medical objects. For this, a graphical representation of the selection list may be displayed for the medical operator by a representation unit. The representation unit may have a monitor and/or a display. The input unit may be integrated in the representation unit, e.g., in the case of a capacitive and/or resistive input display. Alternatively or in addition, the selection information may be received. Receiving the selection information may include capturing and/or reading out a computer-readable data memory and/or receiving from a data memory unit, e.g., a database.

The at least one medical object may be a surgical and/or diagnostic instrument, which in particular is deformable and/or rigid and/or elongate at least in certain sections, e.g., as a catheter and/or endoscope and/or laparoscope and/or guide wire, and/or implant such as a stent and/or coil. The hollow organ may include a vessel, in particular an artery and/or vein, and/or a bladder and/or a lung, in particular bronchia, and/or a section of the intestine and/or the stomach of the examination object. If the selection information has information relating to a plurality of available medical objects, the plurality of medical objects may be different, e.g., in respect of geometric features and/or a material property, (such as a minimum curvature and/or a minimum radius of curvature and/or a coefficient of friction and/or a rigidity and/or a coating), and/or its degrees of freedom of movement and/or its functionality.

Advantageously, the selection information relating to the one or more medical object(s), which are available, may have the respective distinguishing features, e.g., the geometric features and/or the material property and/or the degrees of freedom of movement and/or the functionality.

The specification is determined by applying the specification function to the input data. The input data of the specification function is based on the planning dataset, in particular the mapping and/or the model of the examination object, and the selection information. In particular, the input data may include the planning dataset and the selection information.

The specification function may include a model-based simulation, in particular a simulated arrangement and/or movement of the at least one medical object along different simulated paths in the examination object. In particular, determining the specification by applying the specification function to the input data may include optimizing, in particular minimizing, a cost value of a cost function. Optimizing the cost value may be based on a gradient descent method and/or a downhill simplex method. Furthermore, the specification function may be configured to identify anatomical and/or geometric features of the examination object using the planning dataset, in particular using a mapping of the anatomical and/or geometric features in the planning dataset. The specification function may identify, (in particular segment and/or localize), plaque and/or calcified regions in the examination object using the planning dataset. Furthermore, the specification function may be configured to adjust the suitability information and/or the desired path on the basis of the identified anatomical and/or geometric features of the examination object.

The specification has the suitability information and the desired path. In particular, the specification may include the suitability information and the desired path. The desired path may have a plurality of spatial and/or temporal, in particular spatiotemporal, control points, which are arranged in particular one after another spatially and/or temporally. In particular, the desired path may have a plurality of two-dimensionally or three-dimensionally spatially arranged control points. The control points may specify a desired positioning for the at least one available medical object. The desired positioning may specify a spatial position and/or orientation and/or pose for the at least one medical object. The desired path, in particular the control points of the desired path, may thus specify a spatial and/or temporal sequence of desired positionings in the examination object, in particular the hollow organ, for the at least one available medical object. Advantageously, the desired path may specify the desired positionings for a predefined section, in particular a distal section, of the at least one medical object. The temporal control points may specify one instant and/or a temporal interval respectively, in particular based on the preceding control point respectively at which and/or after which the desired positioning at the respective control point is to be reached by the at least one medical object. In particular, the desired path may have a plurality of spatiotemporal control points, (e.g., a trajectory), along which the at least one medical object, in particular the predefined section, is to move.

Furthermore, the suitability information may assess the suitability of the at least one available medical object for the desired path, in particular for an arrangement and/or movement of the at least one medical object along the control points of the desired path. The suitability information may have a suitability value characterizing the suitability for this purpose, e.g., a mean and/or maximum deviation of the arrangement of the at least one medical object in respect of the desired positionings and/or a compatibility between the at least one medical object and the hollow organ and/or a movement duration and/or movement speed of the at least one medical object along the desired path.

Providing the specification may include storage on a computer-readable storage medium and/or displaying a graphical representation of the specification, in particular of the desired path and/or the suitability information, by the representation unit, and/or transfer to a provisioning unit. A graphical representation of the desired path may be displayed in at least partial overlay with a graphical representation of the planning dataset.

The provided specification may advantageously support a medical operator in path planning and/or selecting a medical object suitable for the desired path or plurality of suitable medical objects.

In a further advantageous embodiment, the selection information relating to a plurality of available medical objects may be captured. The specification may also have an object specification. The object specification may identify one of the available medical objects using the suitability information for the desired path.

Advantageously, determining the specification by applying the specification function to the input data may include determining the object specification. Determining the object specification may advantageously include a comparison of the suitability information of the available medical objects for the desired path. Using the comparison, the medical object with the best suitability, in particular the highest suitability value, may be identified from the available medical objects. The object specification may identify, in particular show, the medical object with the best suitability. Providing the specification may advantageously also include providing the object specification, e.g., displaying a graphical representation of the object specification by the representation unit.

The object specification may enable improved selection of the most suitable medical object, on the basis of its suitability information, for the desired path.

In a further advantageous embodiment, determining the specification by applying the specification function to the input data may include minimizing a cost value of a first cost function. The first cost function may assess a compatibility between the at least one available medical object and a hollow organ of the examination object, in which hollow organ the desired path runs at least partially. In addition, the suitability information may be determined at least partially on the basis of the cost value of the first cost function.

The compatibility between the at least one available medical object and the hollow organ of the examination object may be characterized by an, in particular geometric, capacity of the at least one medical object to be arranged in the hollow organ and/or a capacity to reach a specified target positioning, e.g., at the end of the desired path, and/or a risk assessment such as a risk of injury due to an interaction between the medical object and the hollow organ. The, in particular geometric, capacity of the at least one medical object to be arranged in the hollow organ may be determined using a comparison of geometric features of the at least one medical object and geometric features of the hollow organ. The geometric features of the at least one medical object may include a spatial extent, (e.g., a diameter), in particular along a longitudinal direction of extension of the at least one medical object, and/or a length and/or a shape of the at least one medical object. The geometric features of the hollow organ may include a diameter, in particular an internal diameter, of the hollow organ, in particular along a longitudinal direction of extension of the hollow organ and/or a sinuousness, in particular a tortuosity.

Advantageously, the cost value of the first cost function may assess the compatibility between the at least one available medical object and the hollow organ of the examination object. Once the selection information relating to a plurality of available medical objects has been captured, a cost value of the first cost function for the compatibility between each of the plurality of available medical objects and the hollow organ of the examination object may be determined respectively.

Determining the specification by applying the specification function to the input data may include minimizing the cost value of the first cost function, in particular maximizing the compatibility between the at least one available medical object and the hollow organ. The first cost function may include a compatibility metric.

Advantageously, the suitability information may be determined at least partially on the basis of the cost value of the first cost function. In particular, the suitability information may be dependent on the cost value of the first cost function, e.g., be proportional thereto.

Providing the specification as output data of the specification function may advantageously include providing the suitability information. Owing to the determination of the suitability information based at least partially on the cost value of the first cost function, the specification, in particular the suitability information, may be provided at least partially as a function of the cost value of the first cost function.

The proposed embodiment may enable improved support of the medical operator when selecting the at least one medical object, which has the greatest compatibility with the hollow organ.

In a further advantageous embodiment, tissue information may be determined using the planning dataset. The input data of the specification function may additionally be based on the tissue information.

The tissue information may be spatially and/or temporally resolved. Advantageously, the tissue information may have at least one tissue parameter of the examination object, in particular of the hollow organ. The tissue parameter may characterize an elasticity and/or porosity and/or tissue type of the examination object, in particular of the hollow organ and/or a vessel wall of the hollow organ. According to a first variant, the planning dataset may have the tissue information, in particular the tissue parameter, e.g., spatially and/or temporally resolved. According to a second variant, the tissue information may be determined, in particular identified, using the planning dataset. Different tissue regions of the examination object may be segmented using image values of image points of the planning dataset.

Furthermore, the input data of the specification function may additionally be based on the tissue information, in particular include the tissue information. Determining the desired path and/or determining the suitability information additionally on the basis of the tissue information may be improved hereby.

In a further advantageous embodiment, a start positioning and a target positioning may be identified for a predefined section of the at least one available medical object using the planning dataset. The input data of the specification function may additionally be based on the start positioning and target positioning. In addition, the desired path may begin at the start positioning and end at the target positioning.

The start positioning and/or target positioning for the predefined section of the at least one available medical object may be identified manually, semi-automatically, and/or completely automatically.

According to a first variant, the start positioning and/or target positioning for the predefined section may be captured, in particular manually and/or semi-automatically, using a further user input in respect of a graphical representation of the planning dataset. By the further user input, the medical operator may specify the start positioning and/or target positioning in the graphical representation of the planning dataset. In particular, the medical operator may specify only the target positioning for the predefined section. The start positioning may be determined, in particular automatically, as an instantaneous positioning of the predefined section in the examination object. Alternatively, the medical operator may specify the start positioning for the predefined section, with the target positioning being automatically identified using the planning dataset.

According to a second variant, both the start positioning and the target positioning may be identified completely automatically for the predefined section using the planning dataset. The planning dataset may have an, in particular intraprocedural, mapping of the predefined section in the examination object, in particular the hollow organ. The instantaneous positioning of the predefined section in the examination object, in particular the hollow organ, may be identified using the mapping of the predefined section. Furthermore, the start positioning may be identified as the instantaneous positioning of the predefined section. The target positioning may be identified using anatomical and/or geometric features of the examination object, in particular of the hollow organ, which are mapped in the planning dataset. The geometric features of the examination object, in particular of the hollow organ, may include a contour and/or a contrast and/or a contrast characteristic and/or a marker structure. In addition, the anatomical features of the examination object, in particular of the hollow organ, may include a tissue boundary and/or anatomical landmarks and/or high contrast objects.

Advantageously, the input data of the specification function may additionally be based on the start positioning and target positioning. In particular, the start and the target positioning may be a boundary condition for determining the desired path. This may advantageously provide that the desired path begins at the start positioning and ends at the target positioning. In other words, the first spatial and/or temporal control point of the desired path may specify the start positioning and the last spatial and/or temporal control point of the desired path, the target positioning.

This may enable improved path planning between the start positioning and target positioning.

In a further advantageous embodiment, determining the specification by applying the specification function to the input data may include minimizing a second cost function. The second cost function may assess a movement duration of the at least one available medical object along the desired path from the start positioning to the target positioning. In addition, the suitability information may be determined at least partially on the basis of the cost value of the second cost function.

The movement duration of the at least one of the available medical objects may describe a duration, which begins with a departure from the start positioning by the at least one medical object and ends with the at least one medical object reaching the target positioning along the desired path. The movement duration may thus characterize a measure of a movement speed of the at least one available medical object along the desired path from the start positioning to the target positioning.

Advantageously, the cost value of the second cost function may assess the movement duration of the at least one available medical object along the desired path from the start positioning to the target positioning. Once the selection information relating to a plurality of available medical objects has been captured, a cost value of the second cost function may be determined respectively for the movement duration of each of the plurality of available medical objects along the desired path from the start positioning to the target positioning.

Determining the specification by applying the specification function to the input data may include minimizing the cost value of the second cost function, in particular minimizing the movement duration of the at least one available medical object along the desired path from the start positioning to the target positioning.

Advantageously, the suitability information may be determined at least partially on the basis of the cost value of the second cost function. In particular, the suitability information may be dependent on the cost value of the second cost function, e.g., be proportional thereto.

Providing the specification as output data of the specification function may advantageously include providing the suitability information. Owing to the determination of the suitability information based at least partially on the cost value of the second cost function, the specification, in particular the suitability information, may be provided at least partially as a function of the cost value of the second cost function.

The proposed embodiment may advantageously enable a reduction, in particular minimization, of the duration of the procedure.

In a further advantageous embodiment, the desired path may additionally have at least one movement parameter relating to the movement of the at least one available medical object between the control points of the desired path.

The movement parameter may have a workflow note and/or a control specification relating to the movement of the at least one available medical object between the control points of the desired path. The movement of the at least one available medical object may include a translation and/or rotation and/or a deformation at least in certain sections, in particular a curvature, of the at least one medical object. Furthermore, the movement of the at least one available medical object may include a combination and/or sequence of a plurality of single movements, e.g., a wiggle and/or dotting. The at least one movement parameter may specify a temporally constant or variable, in particular accelerated, movement for the at least one available medical object along the desired path, in particular a direction of movement and/or a movement speed and/or a movement pattern. Advantageously, one movement parameter respectively may be determined for a section of the desired path, which section is delimited by two control points of the desired path. The movement parameter for the different sections of the desired path may be at least partially, in particular completely, identical or different.

The at least one movement parameter may advantageously support the medical operator during a subsequent movement of the at least one medical object. Alternatively, the at least one movement parameter may be provided to a movement apparatus for the robotic movement of the medical object.

In a further advantageous embodiment, an initial path may be received or be determined using the planning dataset, which initial path is independent of the at least one available medical object. In addition, the initial path may have a plurality of initial spatial and/or temporal control points, which initial control points specify one initial desired positioning respectively. Furthermore, the input data may additionally be based on the initial path.

Receiving the initial path may include capturing and/or reading out a computer-readable data memory and/or receiving from a data memory unit, e.g., a database. The database may have pre-ascertained and/or pre-calculated, in particular generic, initial paths for different examination objects, in particular hollow organs, and/or procedures. Alternatively, the initial path may be determined using the planning dataset. The initial path may be determined using geometric and/or anatomical features of the examination object, in particular of the hollow organ, which are mapped in the planning dataset. In particular, the planning dataset may run, at least in certain sections, along a central line of the hollow organ.

The initial path may have a plurality of initial spatial and/or temporal control points, which are arranged in particular spatially and/or temporally one after another. In particular, the initial path may have a plurality of two-dimensionally or three-dimensionally spatially arranged initial control points. The initial control points may specify one initial desired positioning respectively for a possible arrangement of a medical object, in particular independently of the at least one available medical object. The initial desired positioning may specify a spatial position and/or orientation and/or pose for the possible arrangement of the medical object. The initial path, in particular the initial control points of the initial path, may thus specify a spatial and/or temporal sequence of initial desired positionings in the examination object, in particular the hollow organ, for the possible arrangement of the medical object. Because the initial path is received and/or determined independently of the at least one available medical object, the initial control points may have initial desired positionings, which cannot be reached by the at least one available medical object, in particular cannot be reached without damage.

Advantageously, the input data of the specification function may additionally be based on the initial path. The specification function may advantageously adjust the initial path, in particular the initial control points, on the basis of the selection information relating to the at least one available medical object and the planning dataset. Adjusting the initial path on the basis of the selection information and the planning dataset may include minimizing the cost value of the first and/or second cost function(s). The, in particular generic, initial path may be adjusted to the at least one available medical object hereby. The initial path adjusted to the at least one available medical object may be provided as the desired path.

Once the selection information relating to a plurality of available medical objects has been captured, the suitability information may assess the suitability of the available medical objects for the, in particular adjusted, initial path, in particular the desired path. Using the suitability information, the object specification may also identify the medical object from the plurality of available medical objects which has the best suitability for the, in particular adjusted, initial path, in particular the desired path.

This enables particularly reliable path planning and/or selection of the at least one medical object, which is most suitable for the desired path.

In a further advantageous embodiment, the specification function may be configured as a trained function. At least one parameter of the trained function may be adjusted on the basis of a comparison of a training path with a comparison path and training suitability information with comparison suitability information.

The trained function may advantageously be trained by a machine learning method. In particular, the trained function may be a neural network, in particular a convolutional neural network (CNN) or a network including a convolutional layer.

The trained function maps input data on output data. The output data may in particular also depend here on one or more parameter(s) of the trained function. The one or more parameter(s) of the trained function may be determined and/or adjusted by training. Determining and/or adjusting the one or more parameter(s) of the trained function may be based in particular on a pair including training input data and associated training output data, in particular comparison output data, with the trained function being applied to the training input data to generate training mapping data. In particular, determining and/or adjusting may be based on a comparison of the training mapping data and the training output data, in particular the comparison output data. A trainable function, that is to say, a function with one or more parameter(s) as yet unadjusted, may also be referred to as a trained function.

Other terms for trained functions are trained mapping rule, mapping rule with trained parameters, function with trained parameters, algorithm based on artificial intelligence, machine learning algorithm. One example of a trained function is an artificial neural network, with the edge weights of the artificial neural network corresponding to the parameters of the trained function. Instead of the term "neural network," the term "neural net" may also be used. In particular, a trained function may also be a deep artificial neural network (deep neural network). A further example of a trained function is a "Support Vector Machine," in particular other machine learning algorithms may also be used as a trained function.

The trained function may be trained in particular by a back propagation. Training mapping data may be determined by applying the trained function to training input data. A deviation between the training mapping data and the training output data, in particular the comparison output data, may be ascertained accordingly by applying an error function to the training mapping data and the training output data, in particular the comparison output data. Furthermore, at least one parameter, in particular a weighting, of the trained function, in particular of the neural network, may be iteratively adjusted on the basis of a gradient of the error function in respect of the at least one parameter of the trained function. The deviation between the training mapping data and the training output data, in particular comparison output data, during the training of the trained function may be advantageously minimized hereby.

Advantageously, a trained function, in particular the neural network, has an input layer and an output layer. The input layer may be configured for receiving input data. Furthermore, the output layer may be configured for providing mapping data. The input layer and/or the output layer may include a plurality of channels, in particular neurons, respectively.

The input data of the trained function may be based on the planning dataset and the selection information. In particular, the input data of the trained function may include the planning dataset and the selection information. Furthermore, the trained function may provide the specification, in particular the suitability information and the desired path, as output data.

Advantageously, at least one parameter of the trained function may be adjusted on the basis of a comparison of a training path with a comparison path and training suitability information with comparison suitability information. In particular, the trained function may be provided by an embodiment of the proposed method for providing a trained function, which is described hereinafter.

The proposed embodiment may enable a particularly computing-efficient provision of the specification.

The disclosure relates in a second aspect to an, in particular computer-implemented, method for providing a trained function. A training dataset is received, which has a pre-ascertained mapping and/or a model of a training examination object. In addition, a comparison path is received or determined, which has a plurality of spatial and/or temporal control points, which control points specify desired positionings in the training examination object. Furthermore, training selection information relating to one or more available medical object(s) is received. In addition, comparison suitability information is determined on the basis of the training dataset, the training selection information, and the comparison path. Furthermore, a training specification is determined by applying the trained function to input data. The input data is based on the training dataset and the training selection information. Furthermore, at least one parameter of the trained function is adjusted on the basis of a comparison of the training path with the comparison path and the training suitability information with the comparison function. The trained function is provided accordingly.

The previously described acts of the proposed method for providing a trained function may advantageously be carried out successively and/or at least partially simultaneously.

Receiving the training dataset and/or the comparison path and/or the training selection information may include capturing and/or reading out a computer-readable data memory and/or receiving from a data memory unit, e.g., a database. Furthermore, training dataset may be provided by a provisioning unit of the medical imaging device for acquiring the training dataset. The medical imaging device for acquiring the training dataset may include a magnetic resonance tomography system (MRT) and/or a computed tomography system (CT) and/or a medical X-ray device, in particular a medical C-arm X-ray device, and/or an ultrasound device and/or a positron emission tomography system (PET).

The training dataset may have all properties and features of the planning dataset, which were described in relation to the method for providing a specification, and vice versa. In addition, the training dataset may be simulated. Furthermore, the training selection information may have all properties and features of the selection information, which were described in relation to the method for providing a specification, and vice versa.

The training examination object may be a human and/or animal patient, a male or female patient, and/or an examination phantom.

The comparison path may have all features and properties of the desired path, which were described in relation to the method for providing a specification, and vice versa. The training dataset may have a mapping and/or a model of the training examination object, in particular a hollow organ of the training examination object and/or a vessel model in the examination object. The comparison path may have been determined as the desired path according to one embodiment of the proposed method for providing a specification. The specification function may be applied to the training dataset and the training selection information as input data for this purpose and the comparison path may be provided as output data of the specification function. The specification function may include a model-based simulation, in particular a simulated arrangement and/or movement of the at least one medical object along different simulated paths in the training examination object. In particular, applying the specification function to the input data may include optimizing, in particular minimizing, a cost value of a cost function. Optimizing the cost value may be based on a gradient descent method and/or a downhill simplex method. Furthermore, the specification function may be configured to identify anatomical and/or geometric features of the training examination object using the training dataset, in particular using a mapping of the anatomical and/or geometric features in the training dataset.

Alternatively, the comparison path may have a plurality of positionings of at least one medical object, which has been arranged and/or moved in the training examination object or a further training examination object along the comparison path during the course of a training procedure before the beginning of the method. The comparison path may be received by a capturing unit for this purpose, in particular a medical imaging device, for capturing the positioning of the at least one medical object.

The comparison suitability information may be determined as suitability information according to one embodiment of the proposed method for providing a specification, in particular by applying the specification function configured as a model-based simulation to the training dataset and the training selection information as input data. Alternatively, the suitability information may be received from a database, in particular a lookup table, for different treatment sites and/or procedures.

Furthermore, the training specification may be determined by applying the trained function to the input data. The input data may be based on the training dataset and the training selection information. At least one parameter of the trained function may be adjusted by way of a comparison between the training path and the comparison path and between the training suitability information and the comparison suitability information, moreover. The comparison between the training path and the comparison path may include determining a deviation between the control points, in particular the desired positionings, of the comparison path with the control points, in particular the desired positionings, of the training path. Furthermore, the comparison between the training suitability information and the comparison suitability information may include determining a deviation between the training suitability information and the comparison suitability information. The at least one parameter of the trained function may advantageously be adjusted in such a way that the deviation between the training path and the comparison path and the deviation between the training suitability information and the comparison suitability information is minimized. Adjusting the at least one parameter of the trained function may include optimizing, in particular minimizing, a cost value of a further cost function, with the further cost function characterizing, in particular quantifying, the deviation between the training path and the comparison path and the deviation between the training suitability information and the comparison suitability information. In particular, adjusting the at least one parameter of the trained function may include a regression of the cost value of the further cost function.

Providing the trained function may include storage on a computer-readable storage medium and/or transfer to a provisioning unit.

Advantageously, the proposed method may provide a trained function, which may be used in an embodiment of the method for providing a specification.

The disclosure relates in a third aspect to a system, including a provisioning unit. The provisioning unit is configured to carry out a proposed method for providing a specification.

Advantageously, the provisioning unit may include a computing unit, a memory unit, and/or an interface. The provisioning unit may be configured to carry out the method for providing a specification and its aspects in that the interface, the computing unit, and/or the memory unit are configured to carry out the corresponding method acts. In particular, the interface may be configured for receiving the planning dataset, for capturing the selection information, and/or for providing the specification. Furthermore, the computing unit and/or the memory unit may be configured for determining the specification.

The advantages of the proposed system substantially correspond to the advantages of the proposed method for providing a specification. Features, advantages, or alternative embodiments mentioned here may likewise also be transferred to the other claimed subject matters, and vice versa.

In a further advantageous embodiment of a proposed system, the system may also have a capturing unit. The capturing unit may be configured to capture a positioning of a medical object arranged in the examination object in an operating state of the system. Furthermore, the provisioning unit may be configured to compare, at least at the control points of the desired path, the captured positioning with the respective desired positioning. In addition, the provisioning unit may be configured to provide a workflow note in the case of a deviation between the positioning and the respective desired positioning.

The capturing unit may have an electromagnetic and/or acoustic and/or mechanical and/or optical sensor, which is configured to capture the positioning of the medical object arranged in the examination object in the operating state of the system. In particular, the capturing unit, in particular the sensor, may be configured to provide a signal to the provisioning unit as a function of the captured positioning of the medical object. The provisioning unit may also be configured to compare, at least at the control points of the desired path, the captured positioning of the medical object with the respective desired positioning of the desired path, in particular using the signal from the capturing unit. In particular, the provisioning unit may be configured to identify, in particular to quantify, at least at the control points of the desired path, a deviation between the captured positioning of the medical object and the respective desired positioning of the desired path. The provisioning unit may also be configured to provide, in particular output, a workflow note in the case of a deviation between the positioning of the medical object and the respective desired positioning. The provisioning unit may be configured to display a graphical representation of the workflow note by the representation unit.

The proposed embodiment may enable improved, in particular intraprocedural, monitoring of adherence to the desired path in the arrangement and/or movement of the at least one medical object.

In a further advantageous embodiment of the proposed system, the capturing unit may have a medical imaging device, which is configured to map the medical object. The capturing unit may be configured to capture the positioning of the medical object using the mapping. The medical imaging device may be a magnetic resonance tomography system (MRT) and/or computed tomography system (CT) and/or medical X-ray device and/or positron emission tomography system (PET) and/or ultrasound device.

The medical imaging device may be configured to map the medical object, which is arranged in the examination object in the operating state of the system. In particular, the medical imaging device may be configured to acquire intraprocedural medical image data of the examination object with the medical object arranged therein and provide it to the provisioning unit. The provisioning unit may also be configured to identify the positioning of the medical object using the mapping, in particular using the intraprocedural medical image data. The positioning of the medical object may be identified using geometric features of the medical object, which are mapped in the intraprocedural medical image data. The geometric features of the medical object may include a contour and/or a contrast and/or a contrast characteristic and/or a marker structure.

The proposed embodiment may enable improved capture of the positioning of the at least one medical object, in particular in respect of the examination object.

In a further advantageous embodiment of the proposed system, the system may also include a movement apparatus. The movement apparatus may be configured to robotically move the medical object along the desired path according to the specification.

Advantageously, the movement apparatus may be a robotic apparatus, which is configured for remote manipulation of the medical object, e.g., a catheter robot. Advantageously, the movement apparatus may be arranged outside of the examination object in the operating state of the system. The movement apparatus may advantageously be configured to acquire a proximal section of the medical object in the operating state of the system. Furthermore, the movement apparatus may be configured to stop and/or move the medical object by transferring a force. In particular, the movement apparatus may be configured to arrange and/or move the distal section of the medical object by applying the force to the proximal section.

The provisioning unit may advantageously be configured to control the movement apparatus on the basis of the specification in such a way that the medical object is robotically moved along the desired path. For this, the provisioning unit may be configured to translate the specification into control commands for controlling the movement apparatus.

The capturing unit may be at least partially, in particular completely, integrated in the movement apparatus. The capturing unit may be configured to capture an, in particular longitudinal, relative positioning and/or change in relative positioning of the medical object, in particular of the distal section, in respect of the movement apparatus. In addition, capturing unit may be configured to determine the positioning of the medical object, in particular of the distal section, on the basis of the relative positioning and/or change in relative positioning.

The proposed embodiment may enable a particularly precise arrangement and/or movement of the medical object along the desired path.

The disclosure relates in a fourth aspect to a training unit, which is configured to carry out a proposed method for providing a trained function.

The training unit may advantageously include a training interface, a training memory unit, and/or a training computing unit. The training unit may be configured to carry out the method for providing a trained function and its aspects in that the training interface, the training memory unit, and/or training computing unit are configured to carry out the corresponding method acts. In particular, the training interface may be configured for receiving the training dataset, for receiving the comparison path, for receiving the training selection information, and/or for providing the trained function. Furthermore, the training computing unit and/or the training memory unit may be configured to determine the comparison path and/or the comparison suitability information and/or the training specification and/or adjust the at least one parameter of the trained function.

The advantages of the proposed training unit substantially correspond to the advantages of the proposed method for providing a trained function. Features, advantages, or alternative embodiments mentioned here may likewise also be transferred to the other claimed subject matters, and vice versa.

The disclosure relates in a fifth aspect to a computer program product having a computer program, which may be directly loaded into a memory of a provisioning unit, having program segments in order to carry out all acts of the method for providing a specification and/or one of its aspects when the program segments are executed by the provisioning unit; and/or which may be directly loaded into a training memory of a training unit, having program segments in order to carry out all acts of a proposed method for providing a trained function and/or one of its aspects when the program segments are executed by the training unit.

The disclosure may also relate to a computer program or computer-readable storage medium, including a trained function provided by a proposed computer-implemented method or one of its aspects.

An implementation largely in terms of software has the advantage that even previously used provisioning units and/or training units may be easily retrofitted by way of a software update in order to work as disclosed herein. Apart from the computer program, a computer program product of this kind may optionally include additional component parts, such as documentation and/or additional components, as well as hardware components, such as hardware keys (dongles, etc.) in order to utilize the software.

BRIEF DESCRIPTION OF THE DRAWINGS

Exemplary embodiments of the disclosure are represented in the drawings and will be described in more detail below. Identical reference numerals are used in the different figures for identical features. In the drawings:

FIG. 9 depicts a schematic representation of a further advantageous embodiment of a proposed system.

DETAILED DESCRIPTION

Figure 1:
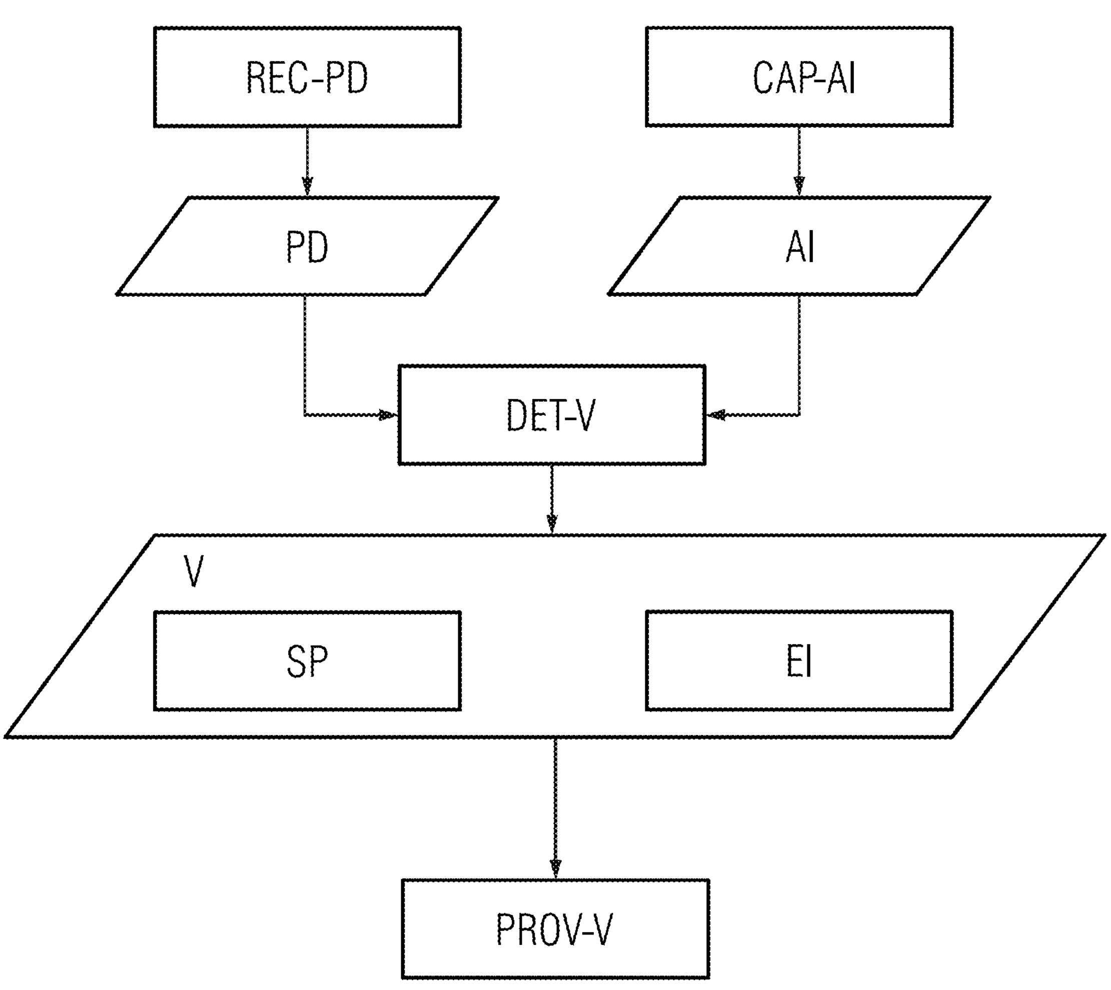
FIGS. 1 to 4 depict schematic representations of different advantageous embodiments of a proposed method for providing a specification.

FIG. 1 schematically represents an advantageous embodiment of a proposed method for providing PROV-V a specification V. A planning dataset PD may be received REC-PD in this case. Advantageously, the planning dataset PD may have a pre-ascertained mapping and/or a model of an examination object. In addition, selection information AI relating to at least one or more available medical object(s) may be captured CAP-AI. Furthermore, the specification V may be determined DET-V by applying a specification function to input data. The input data of the specification function may be based on the planning dataset PD and the selection information AI. In addition, the specification V may have suitability information EI and a desired path SP. The desired path SP may have a plurality of spatial and/or temporal control points, which control points specify desired positionings for the at least one available medical object or for one of the plurality of available medical objects respectively. Furthermore, the suitability information EI may assess a suitability of the at least one available medical object for the desired path SP. The specification V may accordingly be provided PROV-V as output data of the specification function.

Once the selection information AI relating to a plurality of available medical objects has been captured CAP-AI, the specification V may also have an object specification, which object specification identifies one of the available medical objects using the suitability information EI for the desired path SP.

Advantageously, determining DET-V the specification V by applying the specification function to the input data may include minimizing a cost value of a first cost function. The first cost function may assess a compatibility between the at least one available medical object and a hollow organ of the examination object, in which hollow organ the desired path SP runs at least partially. The suitability information EI may be determined at least partially on the basis of the cost value of the first cost function.

Furthermore, the desired path SP may also have at least one movement parameter relating to movement of the at least one available medical object between the control points of the desired path SP.

Advantageously, the specification function may be configured as a trained function. At least one parameter of the trained function may be adjusted on the basis of a comparison of a training path with a comparison path and training suitability information with comparison suitability information.

Figure 2:
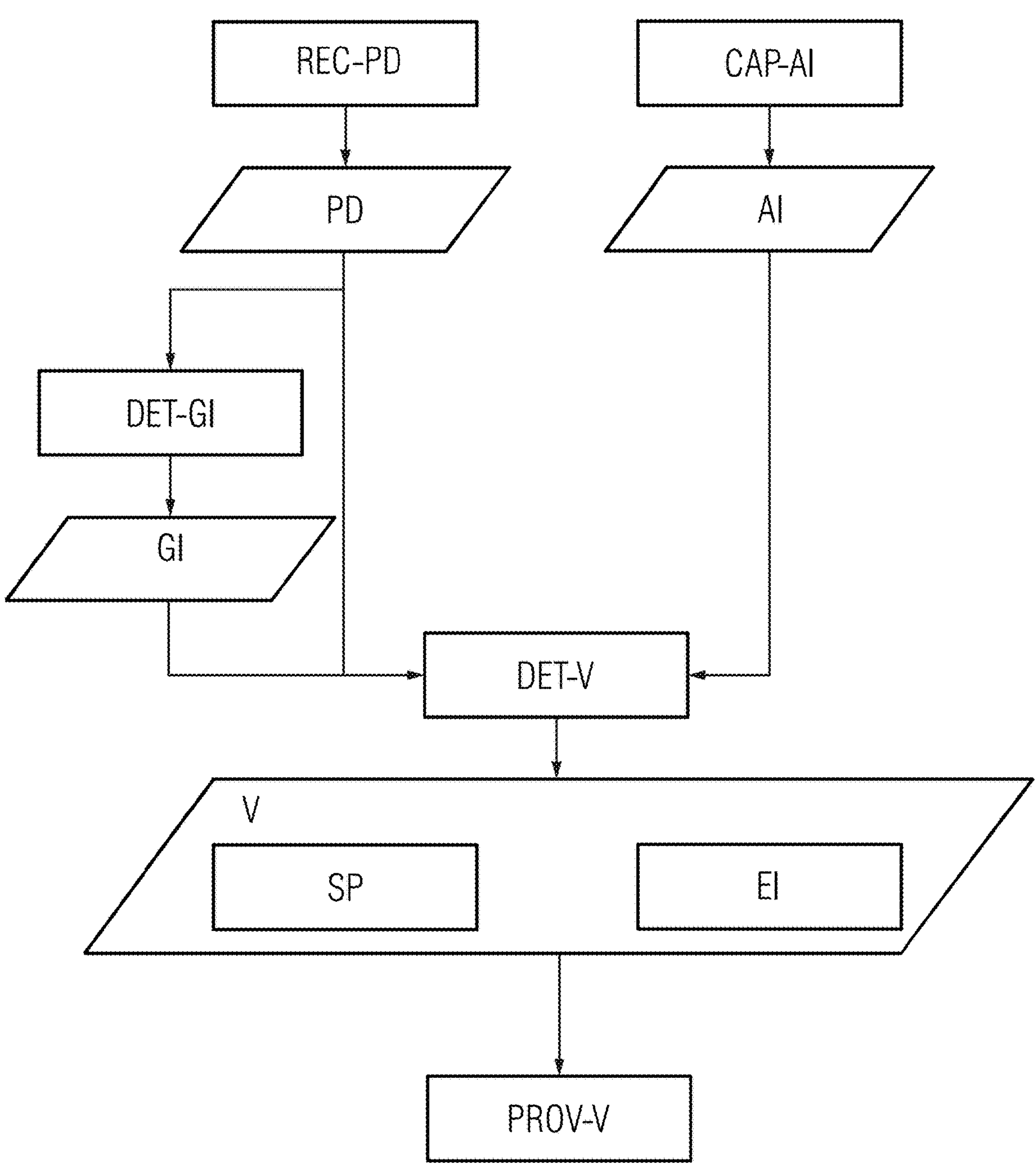

FIG. 2 shows a further advantageous embodiment of a proposed method for providing PROV-V a specification V. Tissue information GI may be determined DET-GI using the planning dataset PD in this case. Furthermore, the input data of the specification function may additionally be based on the tissue information GI.

Figure 3:
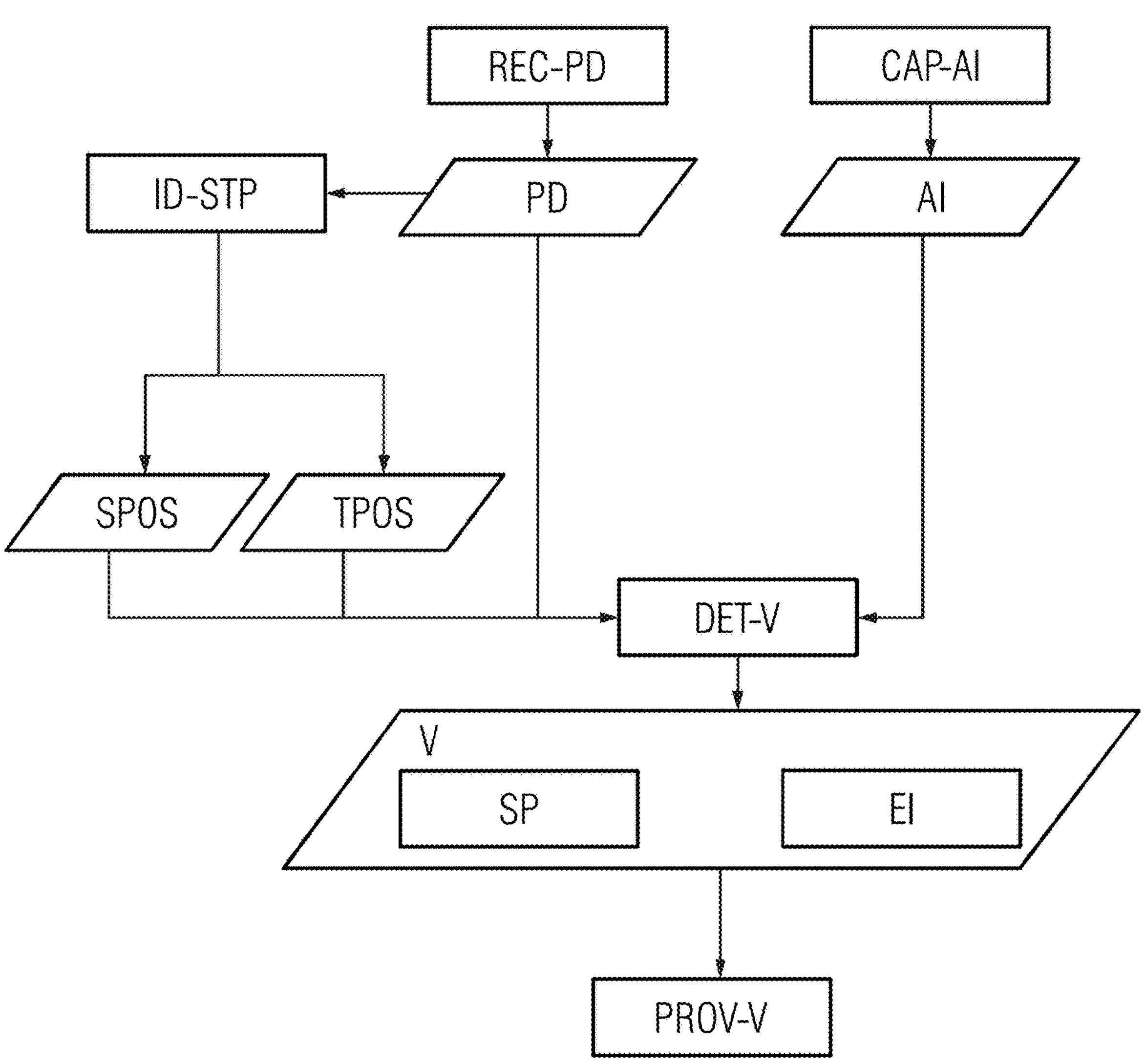

FIG. 3 schematically represents a further advantageous embodiment of a proposed method for providing PROV-V a specification V. Using the planning dataset PD a start positioning SPOS and a target positioning TPOS may be identified ID-STP for a predefined section of the at least one available medical object. The input data of the specification function may additionally be based on the start positioning SPOS and the target positioning TPOS. The desired path SP may advantageously begin at the start positioning SPOS and end at the target positioning TPOS.

In addition, determining DET-V the specification V by applying the specification function to the input data may include minimizing a cost value of a second cost function. The second cost function may assess a movement duration of the at least one available medical object along the desired path SP from the start positioning SPOS to the target positioning TPOS. Furthermore, the suitability information EI may be determined at least partially on the basis of the cost value of the second cost function.

Figure 4:
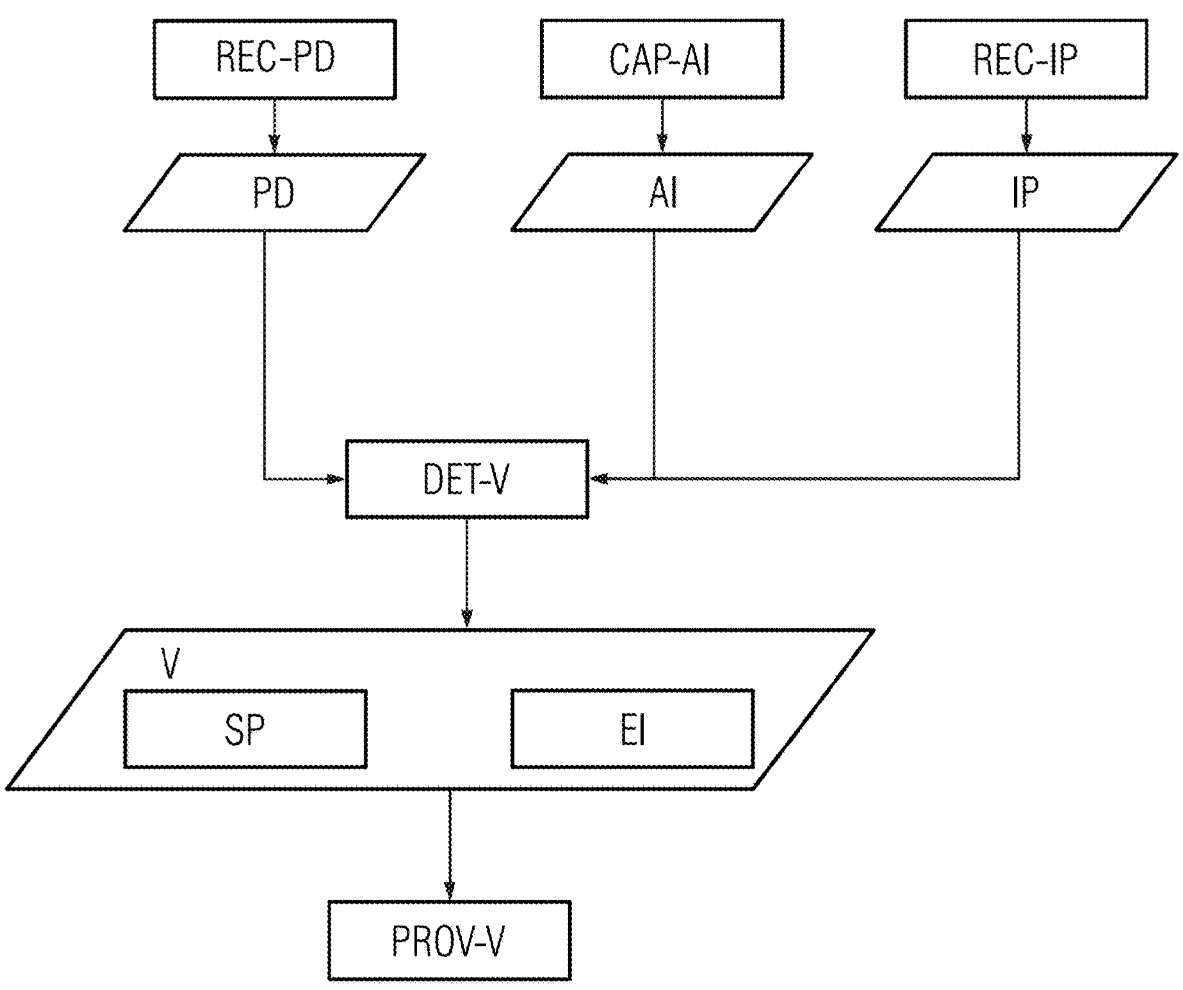

FIG. 4 shows a schematic representation of a further advantageous embodiment of a proposed method for providing PROV-V a specification V. An initial path IP may be received REC-IP in this case. Alternatively, the initial path IP may be determined using the planning dataset PD (not shown here). Furthermore, the initial path IP may be independent of the at least one available medical object and have a plurality of initial spatial and/or temporal control points, which initial control points specify one initial desired positioning respectively. Furthermore, the input data of the specification function may additionally be based on the initial path IP.

Figure 5:
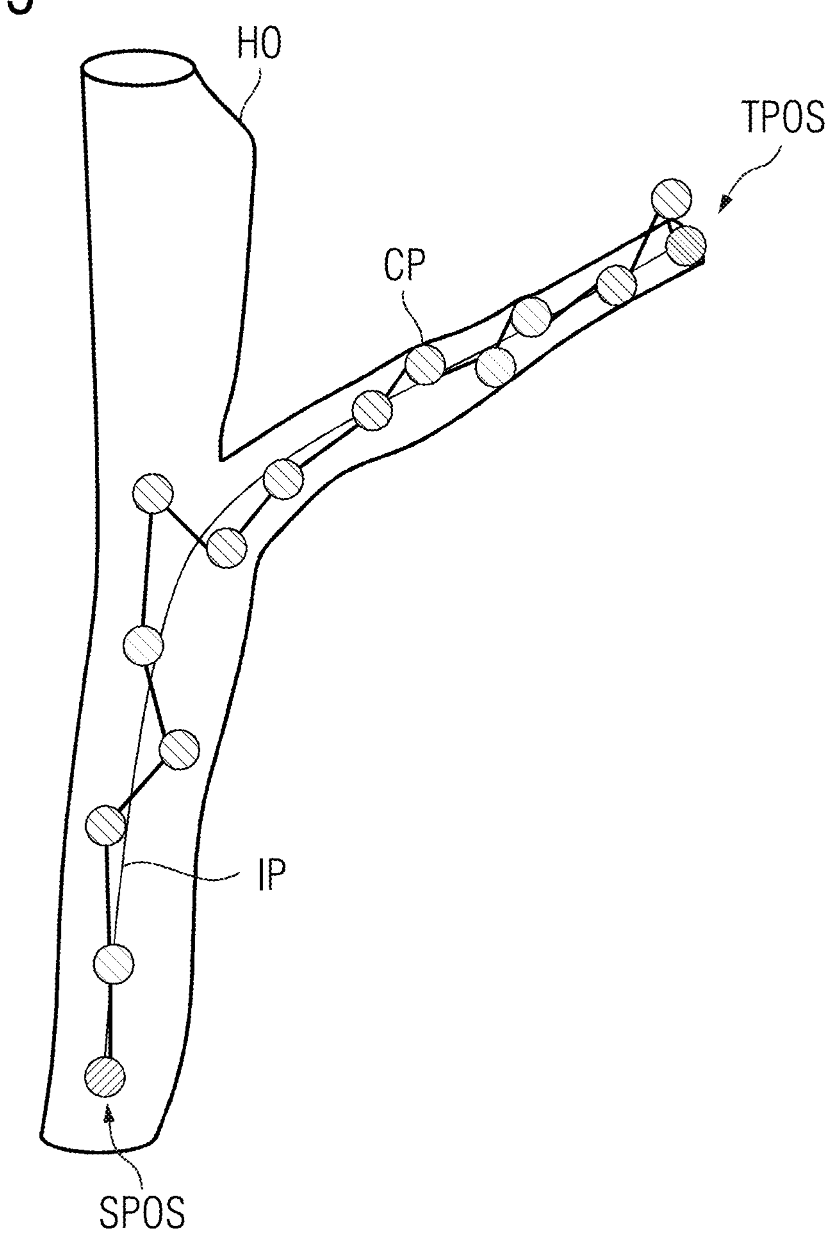
FIG. 5 depicts a schematic representation of an example of a hollow organ having a desired path.

FIG. 5 shows a schematic representation of a hollow organ HO having the desired path SP. The desired path SP may advantageously have a plurality of spatial control points and/or temporal control points CP, (e.g., spatiotemporal control points), which in particular are arranged spatially and/or temporally one after another. Furthermore, using the planning dataset PD, the start positioning SPOS and the target positioning TPOS may be identified for the predefined, in particular distal, section of the at least one medical object. In addition, the initial path IP may be received REC-IP or be determined using the planning dataset PD. Advantageously, the input data of the specification function may additionally be based on the start positioning SPOS, the target positioning TPOS and the initial path IP. The specification function may advantageously adjust the initial path IP on the basis of the input data and provide PROV-SP the desired path SP as output data.

Figure 6:
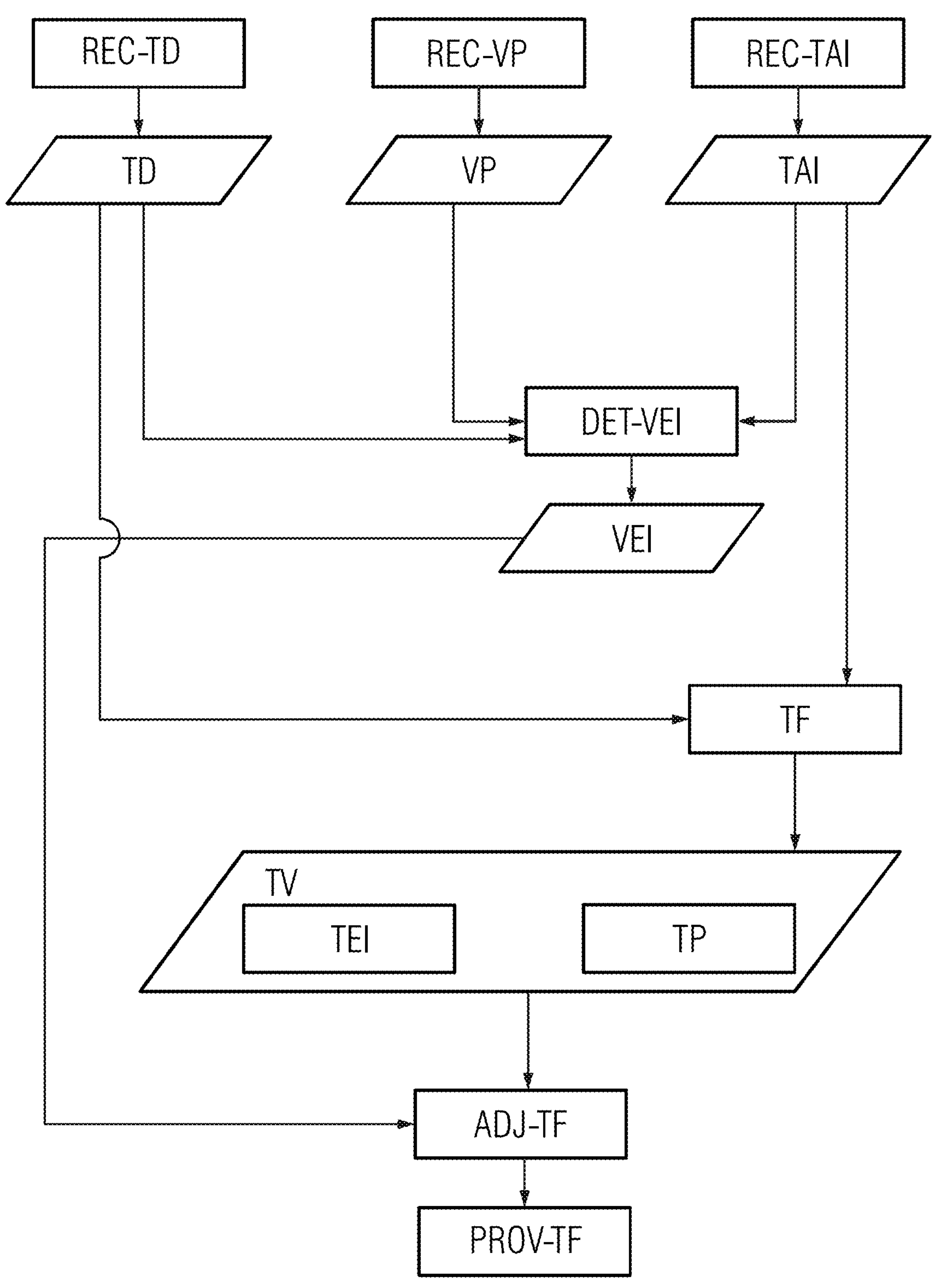
FIG. 6 depicts a schematic representation of an advantageous embodiment of a proposed method for providing a trained function.

FIG. 6 schematically represents an advantageous embodiment of a proposed method for providing PROV-TF a trained function TF. A training dataset TD may be received REC-TD in this case. The training dataset TD may have a pre-ascertained mapping and/or a model of a training examination object. Furthermore, a comparison path VP may be received REC-VP or be determined, which has a plurality of spatial and/or temporal control points, which control points specify desired positionings in the training examination object. Furthermore, training selection information TAI relating to one or more available medical object(s) may be received REC-TAI. Furthermore, comparison suitability information VEI may be determined DET-VEI on the basis of the training dataset TD, the training selection information TAI and the comparison path VP.

Furthermore, a training specification TV may be determined by applying the trained function TF to input data. The input data may be based on the training dataset TD and the training selection information TAI. The training specification TV may have a training path TP and training suitability information TEI. At least one parameter of the trained function TF may accordingly be adjusted ADJ-TF on the basis of a comparison of the training path TP with the comparison path VP and the training suitability information TEI with the comparison suitability information VEI. Furthermore, the trained function TF may be provided PROV-TF.

Figure 7:
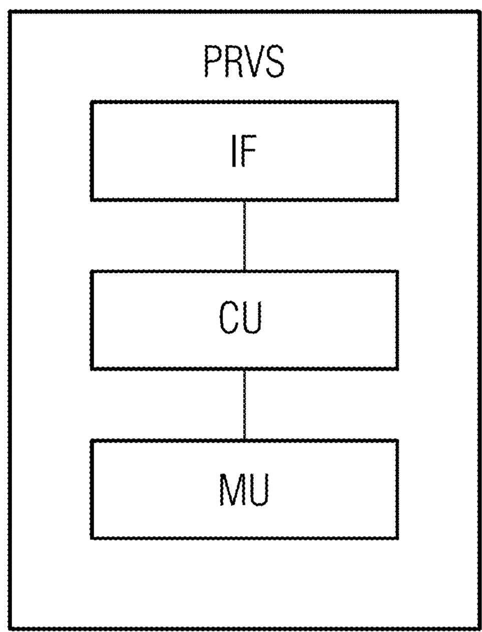
FIG. 7 depicts a schematic representation of an example of a system having a provisioning unit.

FIG. 7 schematically represents an advantageous embodiment of a proposed system having a provisioning unit PRVS. The provisioning unit PRVS may advantageously include a computing unit CU, a memory unit MU, and/or an interface IF. The provisioning unit PRVS may be configured to carry out a proposed method for providing PROV-V a specification V in that the interface IF, the computing unit CU and/or the memory unit MU are configured to carry out the corresponding method acts. In particular, the interface IF may be configured for receiving REC-PD the planning dataset PD, for capturing CAP-AI the selection information AI and/or for providing PROV-V the specification V. Furthermore, the computing unit CU and/or the memory unit MU may be configured for determining DET-V the specification V.

Figure 8:
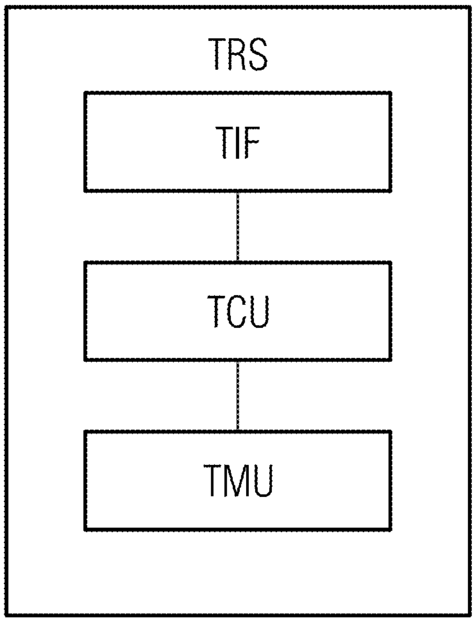
FIG. 8 depicts a schematic representation of an example of a training unit.

FIG. 8 shows a schematic representation of an advantageous embodiment of a proposed training unit TRS. The training unit TRS may advantageously include a training interface TIF, a training memory unit TMU, and/or a training computing unit TCU. The training unit TRS may be configured to carry out a proposed method for providing PROV-TF a trained function TF in that the training interface TIF, the training memory unit TMU, and/or the training computing unit TCU are configured to carry out the corresponding method acts. In particular, the training interface TIF may be configured for receiving REC-TD the training dataset TD, for receiving REC-VP the comparison path VP, for receiving REC-TAI the training selection information TAI, and/or for providing PROV-TF trained function TF. In addition, the training computing unit TCU and/or the training memory unit TMU may be configured to determine the comparison path VP and/or comparison suitability information VEI and/or the training specification TV and/or adjust ADJ-TF the at least one parameter of the trained function TF.

FIG. 9 schematically represents a further advantageous embodiment of a proposed system. The system may have a capturing unit, which is configured to capture a positioning of a medical object MO arranged in the examination object 31 in an operating state of the system. Advantageously, the capturing unit may also have a medical imaging device, which is configured to map the medical object MO. FIG. 9 represents, (e.g., for an imaging device of the method), a medical C-arm X-ray device 37. The capturing unit may also be configured to capture the positioning of the medical object MO using the mapping. The provisioning unit PRVS may also be configured to compare, at least at the control points of the desired path SP, the captured positioning with the respective desired positioning and in the case of a deviation between the positioning and the respective desired positioning, to provide a workflow note.

The medical C-arm X-ray device 37 advantageously includes a detector 34 here, in particular an X-ray detector, and an X-ray source 33. Furthermore, the medical C-arm X-ray device 37 may be configured for acquiring medical image data of the examination object 31 arranged on a patient supporting apparatus 32. For acquiring the medical image data, an arm 38 of the C-arm X-ray device 37 may be mounted to move around one or more axes. Furthermore, the medical C-arm X-ray device 37 may include a movement unit 39, which enables a movement of the C-arm X-ray device 37 in the space. In addition, the provisioning unit PRVS may send a corresponding signal 24 to the X-ray source 33 in order to acquire the medical image data. The X-ray source 33 may then emit an X-ray beam bundle. When the X-ray beam bundle, following an interaction with the examination object 31, impinges on a surface of the detector 34, the detector 34 may send a signal 21 to the provisioning unit PRVS. The provisioning unit PRVS may receive the mapping of the examination object 31, e.g., using the signal 21.

Furthermore, the system may include a movement apparatus CR, which is configured to robotically move the medical object MO along the desired path SP in accordance with the specification V. The provisioning unit PRVS may advantageously be configured to control the movement apparatus CR by a signal SIG.

Furthermore, the system may have an input unit 42, (e.g., a keyboard and/or a pointing device), and a representation unit 41, (e.g., a monitor and/or display). The input unit 42 may be integrated in the representation unit 41, e.g., in the case of a capacitive and/or resistive input display. The representation unit 41 may advantageously be configured for displaying a graphical representation of the planning dataset PD and/or the specification V. For this, the provisioning unit PRVS may send a signal 25 to a representation unit 41. The input unit 42 may be configured for capturing a signal 26 of a user input of a medical operator. This may enable control of the medical C-arm X-ray device 37 and/or the movement apparatus CR and/or the provisioning unit PRVS on the basis of the captured user input.

The schematic representations contained in the described figures do not indicate any kind of scale or size ratios.

To conclude, reference is made once more to the fact that the preceding methods described above in detail and the represented apparatuses are merely exemplary embodiments, which a person skilled in the art may modify in a wide variety of ways without departing from the scope of the disclosure. Furthermore, use of the indefinite article "a" or "an" does not preclude the relevant features from also being present multiple times. Similarly, the terms "unit" and "element" do not preclude the relevant components from being composed of a plurality of cooperating sub-components, which may optionally also be spatially distributed.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing a specification, the method comprising:

receiving, by a provisioning unit of a medical imaging system, a planning dataset having a pre-ascertained mapping and/or a model of an examination object;

capturing, by the provisioning unit, selection information relating to a plurality of available medical objects;

determining, by the provisioning unit, the specification by applying a specification function to input data and minimizing a cost value of a first cost function, wherein the input data is based on the planning dataset and the selection information, wherein the specification has suitability information and a desired path, wherein the desired path has a plurality of spatial control points and/or temporal control points that specify desired positionings for the plurality of available medical objects, wherein the suitability information assesses a suitability of the plurality of available medical objects for the desired path, wherein the first cost function assesses a compatibility between the plurality of available medical objects and a hollow organ of the examination object in which the desired path runs at least partially, and wherein the suitability information comprises a suitability value characterizing the suitability of each available medical object of the plurality of available medical objects for an arrangement and/or movement of the plurality of available medical objects along the plurality of spatial control points and/or temporal control points of the desired path, the compatibility between the plurality of available medical objects and the hollow organ of the examination object, a movement speed of the plurality of available medical objects along the desired path from a start positioning to a target positioning, or a combination thereof;

identifying, by the provisioning unit, an available medical object of the plurality of available medical objects using the suitability information for the desired path in which a medical object of the plurality of available medical objects having a highest suitability value for the desired path is selected;

receiving, by a display of the medical imaging system, a graphical representation of the specification as output data of the specification function;

displaying, by the display, the graphical representation of the specification; and providing, by the provisioning unit, instructions to a movement apparatus of the medical imaging system to move the identified available medical object along the desired path in accordance with the specification.

2. The method of claim 1, wherein tissue information is determined using the planning dataset, and wherein the input data of the specification function is additionally based on the tissue information.

3. The method of claim 2, wherein, in using the planning dataset, the start positioning and the target positioning are identified for a predefined section of the one or more available medical objects, wherein the input data of the specification function is additionally based on the start positioning and the target positioning, and wherein the desired path begins at the start positioning and ends at the target positioning.

4. The method of claim 3, wherein the determining of the specification further comprises minimizing a cost value of a second cost function, wherein the second cost function assesses a movement duration of the plurality of available medical objects along the desired path from the start positioning to the target positioning, and wherein the suitability information is determined at least partially based on the cost value of the second cost function.

5. The method of claim 1, wherein tissue information is determined using the planning dataset, and wherein the input data of the specification function is additionally based on the tissue information.

6. The method of claim 1, wherein, in using the planning dataset, the start positioning and the target positioning are identified for a predefined section of the plurality of available medical objects, wherein the input data of the specification function is additionally based on the start positioning and the target positioning, and wherein the desired path begins at the start positioning and ends at the target positioning.

7. The method of claim 6, wherein the determining of the specification comprises minimizing a cost value of a second cost function, wherein the second cost function assesses a movement duration of the plurality of available medical objects along the desired path from the start positioning to the target positioning, and wherein the suitability information is determined at least partially based on the cost value of the second cost function.

8. The method of claim 1, wherein the desired path has at least one movement parameter for moving the plurality of available medical objects between the plurality of spatial control points and/or the temporal control points of the desired path.

9. The method of claim 1, wherein the specification function is configured as a trained function, and wherein at least one parameter of the trained function is adjusted based on a comparison of a training path with a comparison path and training suitability information with comparison suitability information.

10. A system comprising:

a provisioning unit having a computer and a memory, wherein the provisioning unit is configured to:

receive a planning dataset having a pre-ascertained mapping and/or a model of an examination object;

capture selection information relating to a plurality of available medical objects; and determine a specification by applying a specification function to input data and minimize a cost value of a first cost function, wherein the input data is based on the planning dataset and the selection information, wherein the specification has suitability information and a desired path, wherein the desired path has a plurality of spatial control points and/or temporal control points that specify desired positionings for the plurality of available medical objects, wherein the suitability information assesses a suitability of the plurality of available medical objects for the desired path, wherein the first cost function assesses a compatibility between the plurality of available medical objects and a hollow organ of the examination object in which the desired path runs at least partially, wherein the suitability information comprises a suitability value characterizing the suitability of each available medical object of the plurality of available medical objects for an arrangement and/or movement of the plurality of available medical objects along the plurality of spatial control points and/or temporal control points of the desired path, the compatibility between the plurality of available medical objects and the hollow organ of the examination object, a movement speed of the plurality of available medical objects along the desired path from a start positioning to a target positioning, or a combination thereof;

identify an available medical object of the plurality of available medical objects using the suitability information for the desired path in which a medical object of the plurality of available medical objects having a highest suitability value for the desired path is selected; and provide instructions to a movement apparatus of the system to move the identified available medical object along the desired path in accordance with the specification; and a display configured to receive a graphical representation of the specification as output data of the specification function from the provisioning unit and display the graphical representation of the specification.

11. The system of claim 10, wherein the system is further configured to:

capture a positioning of a medical object arranged in the examination object in an operating state of the system;

compare, at least at the plurality of spatial control points and/or temporal control points of the desired path, the captured positioning with the respective desired positioning; and provide a workflow note when there is a deviation identified in the comparison between the captured positioning and the respective desired positioning.

12. The system of claim 11, wherein the system is further configured to map the medical object, wherein the system is further configured to capture the positioning of the medical object using the mapping, and wherein the system comprises a magnetic resonance tomography system, a computed tomography system, a medical X-ray device, a positron emission tomography system, an ultrasound device, or a combination thereof.

13. The system of claim 12, wherein the movement apparatus is a robot configured to robotically move the medical object along the desired path in accordance with the specification.

14. The system of claim 10, wherein the movement apparatus is a robot configured to robotically move the medical object along the desired path in accordance with the specification.

15. The method of claim 1, wherein the suitability value further characterizes a mean deviation of an arrangement of the plurality of available medical objects in respect of the desired positionings and/or a maximum deviation of the arrangement of the plurality of available medical objects in respect of the desired positionings.

16. The method of claim 1, wherein the graphical representation comprises a graphical representation of the desired path at least partially overlayed with a graphical representation of the planning dataset.

17. The method of claim 1, further comprising:

receiving an initial path or determining the initial path using the planning dataset, wherein the initial path is independent of the plurality of available medical objects and has a plurality of initial spatial control points and/or initial temporal control points that specify one initial desired positioning respectively, wherein the input data is based on the planning dataset, the selection information, and the initial path, and wherein the specification function adjusts the plurality of initial spatial control points and/or initial temporal control points of the initial path based on the selection information and the planning dataset by minimizing the cost value of the first cost function to provide the desired path.

18. The method of claim 1, further comprising:

moving, by the movement apparatus, the identified available medical object along the desired path in accordance with the specification.

19. The method of claim 1, wherein the movement apparatus is a robot.

20. The method of claim 1, wherein the provisioning unit comprises a computer and a memory.

* * * * *